(12) United States Patent
Odake et al.

(10) Patent No.: US 7,508,467 B2
(45) Date of Patent: Mar. 24, 2009

(54) BACKLIGHT DEVICE AND LIQUID CRYSTAL DISPLAY DEVICE

(75) Inventors: Ryota Odake, Tokyo (JP); Toshitaka Kawashima, Kanagawa (JP); Shuji Moro, Tokyo (JP); Hiroyuki Okita, Hiroshima (JP)

(73) Assignee: Sony Corporation, Tokyo (JP)

( * ) Notice: Subject to any disclaimer, the term of this patent is extended or adjusted under 35 U.S.C. 154(b) by 515 days.

(21) Appl. No.: 10/568,128

(22) PCT Filed: Jun. 10, 2005

(86) PCT No.: PCT/JP2005/010705

§ 371 (c)(1),
(2), (4) Date: Feb. 14, 2006

(87) PCT Pub. No.: WO2005/121879

PCT Pub. Date: Dec. 22, 2005

(65) Prior Publication Data

US 2008/0192174 A1    Aug. 14, 2008

(30) Foreign Application Priority Data

Jun. 14, 2004    (JP)    ............................. 2004-176147

(51) Int. Cl.
G02F 1/1335    (2006.01)
G02F 1/1339    (2006.01)
(52) U.S. Cl. .............................. 349/62; 349/58; 349/61
(58) Field of Classification Search ........................ None
See application file for complete search history.

(56) References Cited

U.S. PATENT DOCUMENTS

2002/0036728 A1* 3/2002 Okumura .................... 349/61
2002/0196385 A1* 12/2002 He et al. ...................... 349/61
2003/0026096 A1    2/2003 Ellens et al.
2003/0128307 A1* 7/2003 Ito et al. ...................... 349/58
2005/0062903 A1* 3/2005 Cok et al. .................... 349/69

FOREIGN PATENT DOCUMENTS

| JP | 8-122782 | 5/1996 |
| JP | 11-242219 | 9/1999 |
| JP | 2000-149633 | 5/2000 |
| JP | 2003-141905 | 5/2003 |

* cited by examiner

Primary Examiner—Tina M Wong
(74) Attorney, Agent, or Firm—Sonnenschein Nath & Rosenthal LLP

(57) ABSTRACT

A backlight device includes a light source (21) arranged in a casing (23) opened in a light radiating surface (20a), so that the light source faces the light radiating surface (20a) and radiates light towards the light radiating surface (20a), a light transmitting reflecting plate (25) arranged in the casing for delimiting a space inclusive of the light source (21) and adapted for transmitting a fraction of the incident light and for reflecting another fraction of the incident light, and a light transmitting diffusing plate (41) arranged on the light radiating surface (20a) of the casing (23) for diffusing the light transmitted through the light transmitting reflecting plate (25) and for causing surface light radiation. A light reflecting surface (24) is formed on the inner surface of the casing (23). A portion of light radiated by the light source (21) is internally reflected by the light transmitting reflecting plate (25) and by the light reflecting surface (24), in a space delimited in the casing (23) by the light transmitting reflecting plate (25), after which the light portion is transmitted through the light transmitting reflecting plate (25).

14 Claims, 14 Drawing Sheets

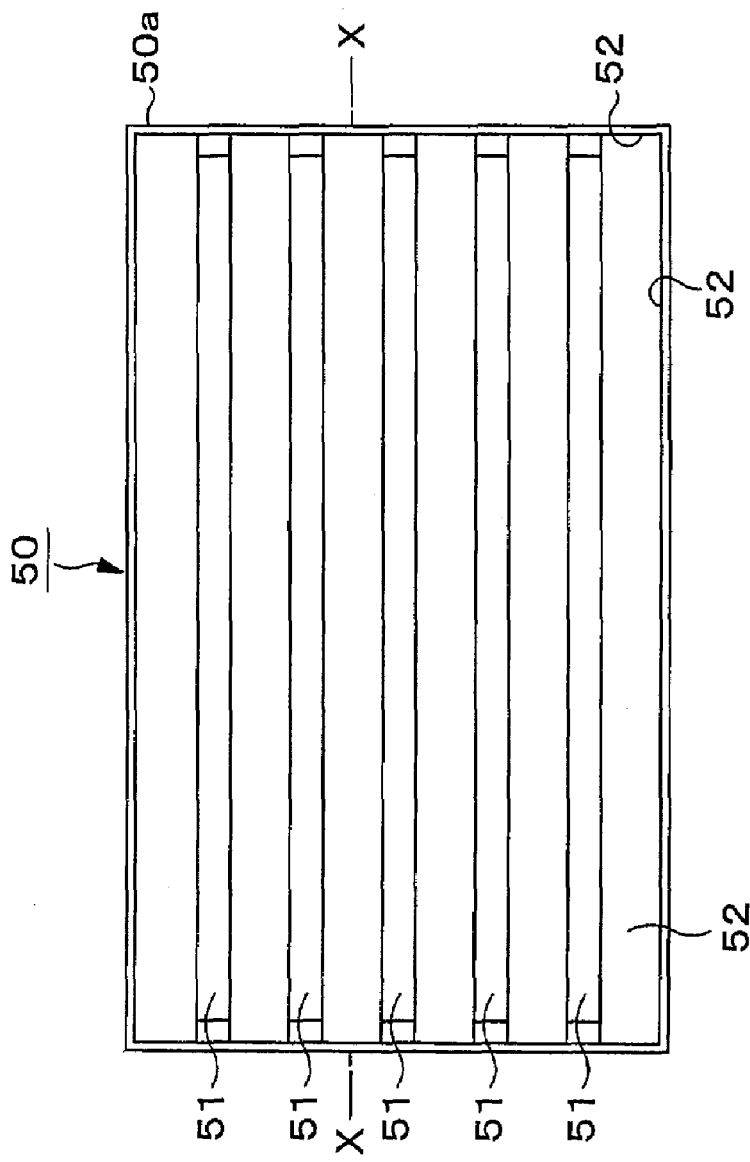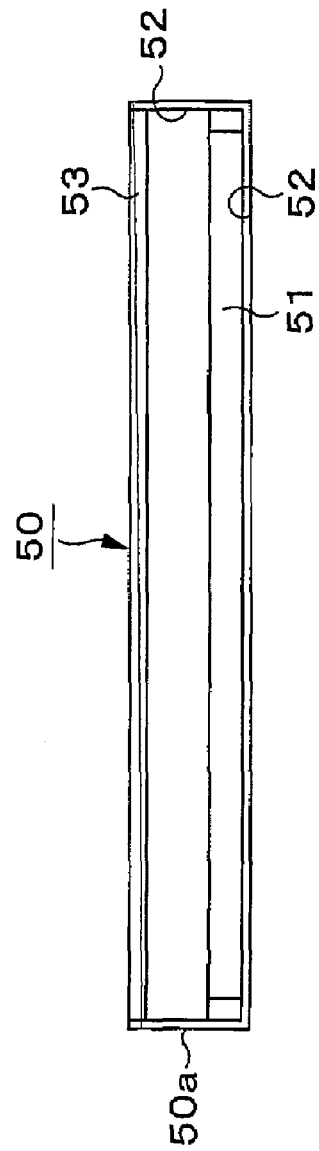
FIG. 1A PRIOR ART
FIG. 1B PRIOR ART

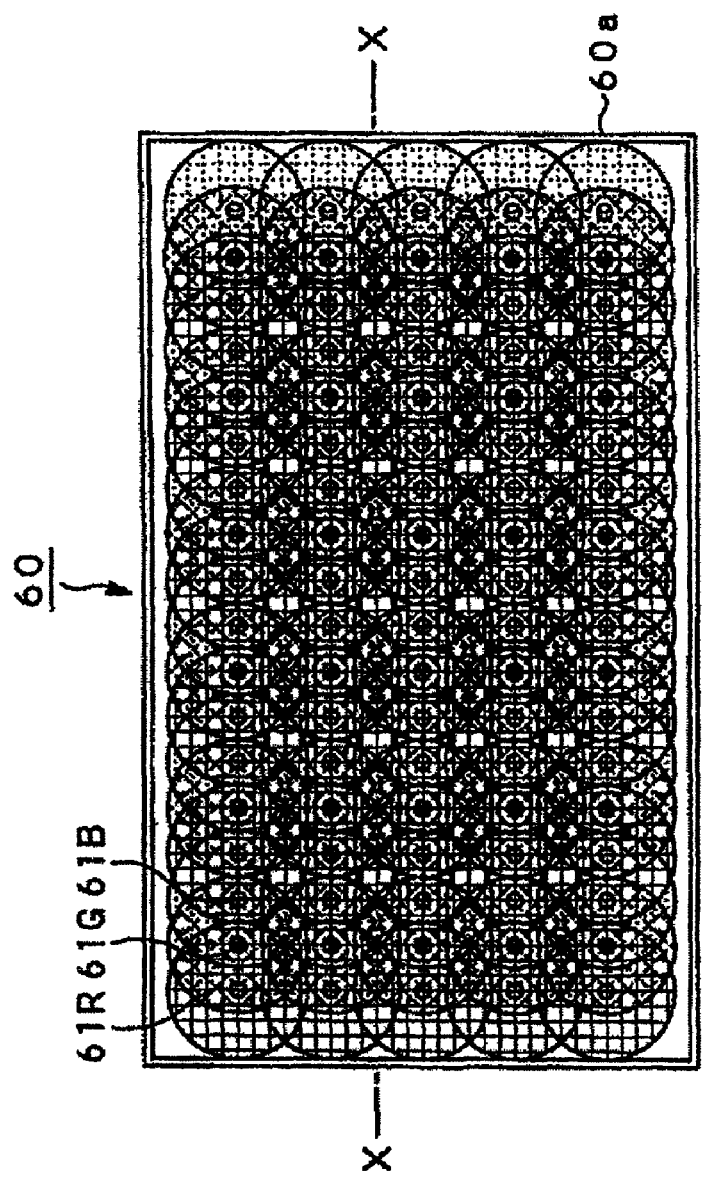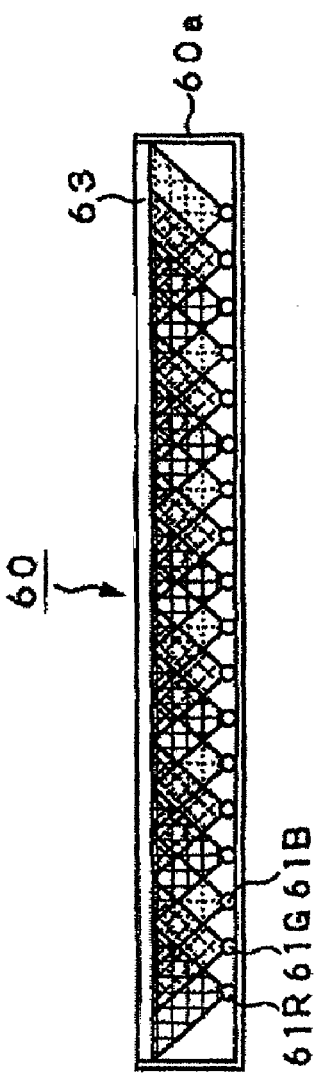
FIG.3A PRIOR ART
FIG.3B PRIOR ART

BACKLIGHT DEVICE AND LIQUID CRYSTAL DISPLAY DEVICE

TECHNICAL FIELD

This invention relates to a backlight device for a liquid crystal display (LCD) device. More particularly, it relates to a backlight device of a thin thickness and a liquid crystal display device employing this backlight device.

The present invention contains subject matter related to Japanese Patent Application 2004-176147 filed in Japan on Jun. 14, 2004, the entire contents of which are incorporated herein by reference.

BACKGROUND ART

Television receivers of very thin thicknesses, such as a liquid crystal display device (LCD) or a plasma display panel (PDP), have been devised and put to practical use to take the place of the cathode ray tube (CRT) which has long been used since the start of television broadcasting. In particular, the liquid crystal display device, employing a liquid crystal display panel, is a highly promising display type and is expected to become widespread in time to come because it permits driving at low power usage and a large size liquid crystal panel may be offered at a reasonable cost.

The mainstream of the liquid crystal display device is that of the backlight system in which a light transmitting liquid crystal display panel, fitted with a color filter, is illuminated from its back side with a backlight device. As a light source for the backlight device, a fluorescent lamp, radiating white light using a fluorescent tube (Cold Cathode Fluorescent Lamp), has predominantly been in use.

On the other hand, in consideration that the CCFL uses silver contained in the fluorescent tube and hence may be pollutant to the environment, a light emitting diode (LED) is thought to be auspicious as a light source to be used in place of the CCFL. With the development of the blue light emitting diode, the three sorts of the light emitting diodes, radiating the light for three prime colors, namely green light, red light and blue light, are now in order, and white light of high color purity may be obtained by mixing the green light, red light and blue light, radiated by these three sorts of the light emitting diodes. With use of these light emitting diodes, as the light source of the backlight device, the color light beams, obtained from the liquid crystal display panel, may be improved in color purity, thereby appreciably broadening the gamut of color reproduction as compared to the case of using the CCFL.

Patent Publication 1 Japanese Patent Application laid-Open No. H07-191311

FIG. 1 shows a backlight box 50, as a backlight device employing a fluorescent lamp, as a light source. FIG. 1A depicts a front view of the backlight box 50 and FIG. 1B depicts a cross-sectional view of the backlight box 50 taken along line X-X of FIG. 1A. Meanwhile, a light transmitting/diffusing plate 53, shown in FIG. 1B, is not shown in FIG. 1A for illustrating how the fluorescent lamps 1 are arrayed.

Referring to FIG. 1, the backlight box 50 includes a casing 50a, opened at an upper end, a plural number of fluorescent lamps 51, arranged parallel to one another in the casing, and a light transmitting diffusion plate 53, provided for closing the opened end of the casing 50a. On the inner surfaces (inner lateral surfaces and inner bottom surface) of the casing 50a, there are formed reflecting surfaces 52 for scattering and reflecting the white light emitted from the fluorescent lamps 51.

On top of the light transmitting diffusion plate 53 of the backlight box 50, a light transmitting liquid crystal display panel, not shown, is provided to form a liquid crystal display device. The light transmitting diffusion plate 53, provided to the backlight box 50, diffuses the direct light from the fluorescent lamps 51 or light reflected from the reflecting surfaces 52, to generate white light of uniform light volume free from variations in color or in brightness. The so generated white light is radiated by surface light emission. The backlight box 50 illuminates the liquid crystal display panel with the white light radiated by surface light emission.

Specifically, the light transmitting diffusion plate 53 is subjected to processing for enlarging the angle of diffusion of incident light, or to preset patterning, such as to prevent variations in brightness from being produced to produce irregular brightness due to formation from the direct light emitted by the fluorescent lamps 51 of blurred plural images of a light source by the plural fluorescent lamps 51 on the light transmitting/diffusing plate 53. The light transmitting/diffusing plate 53 may also be increased in thickness for enhancing the effect of diffusion.

However, even if ideal perfect scattering is realized by the light transmitting diffusion plate 53, as a result of the aforementioned processing for adjusting the angle of diffusion or for patterning, there still persists the problem that an image of a light source on the light transmitting diffusion plate 53 cannot completely be erased, in case the distance between the fluorescent lamps 51, emitting the white light, and the light transmitting diffusion plate 53, is short, that is, if the backlight box 50 is not of a sufficient thickness.

Moreover, if the light transmitting diffusion plate 53 is of an enlarged angle of diffusion, or is subjected to preset patterning, as described above, there may be raised a further problem that the light volume of the component in the vertical direction of the white light from the backlight box 50 with respect to the liquid crystal display panel is excessively attenuated, thus drastically lowering the front-surface brightness.

FIG. 2 shows a backlight box 60, as a backlight device employing a fluorescent lamp, as a light source. FIG. 2A depicts a front view of the backlight box 60 and FIG. 2B depicts a cross-sectional view of the backlight box 60 taken along line X-X of FIG. 2A. Meanwhile, a light transmitting/diffusing plate 63, shown in FIG. 2B, is not shown in FIG. 2A for illustrating how red light emitting diodes 61R, green light emitting diodes 61G and blue light emitting diodes 61B are arrayed.

Referring to FIG. 2, the backlight box 60 includes, within a casing 60a, opened at an upper end, a plural number of the red light emitting diodes 61R, a plural number of the green light emitting diodes 61G and a plural number of the blue light emitting diodes 61B, arranged at a preset sequence and with preset separation from one another. In an opened end of the casing 60a, the light transmitting/diffusing plate 63, having the same function as that of the backlight box 60, is mounted. On inner surfaces (inner lateral surfaces and inner bottom surface) of the casing 60a, there are provided reflecting surfaces 62 for scattering and reflecting red light, green light and blue light, radiated from the red light emitting diodes 61R, green light emitting diodes 61G and the blue light emitting diodes 61B, in the inside of the casing 60a, respectively. Meanwhile, if, in the explanation to follow, the red light emitting diodes 61R, green light emitting diodes 61G and the blue light emitting diodes 61B, are referred to collectively, they are simply referred to as light emitting diodes 61.

A liquid crystal display device is architected by arranging a light transmitting liquid crystal display panel, not shown, on the light transmitting/diffusing plate 63 of the backlight box 60. The backlight box 60 mixes the red light, green light and the blue light, emitted from the light emitting diodes 61, by reflection by the reflecting surfaces 52 and by diffusion by the light transmitting diffusion plate 63, into white light, which is then radiated to the liquid crystal display panel, not shown, by surface light emission and light illumination.

Referring to FIG. 2A, light emitting diodes 61 are arrayed in the casing 60a of the backlight box 60 at a preset spacing from one another. The light emitting diodes 61, thus arrayed in the casing 60a of the backlight box 60, operate as point light sources, and hence the light beams of the respective colors are not emitted from the same points. It is therefore extremely difficult to mix the colors evenly on the light transmitting/diffusing plate 63 such as to preclude variations in color or in brightness.

For example, as shown in FIG. 3B, when the casing 60a of the backlight box 60 is reduced in thickness, such that a sufficient distance from the light emitting diodes 61 as far as the light transmitting/diffusing plate 63 may not be obtained, the light beams of the respective colors, getting to the light transmitting/diffusing plate 63, exhibit the light distribution shown in FIG. 3A, with the consequence that sufficient color mixing cannot be achieved.

FIG. 3A depicts a front view of the backlight box 60, showing the state of light distribution of the light emitting diodes 61, and FIG. 3B is a cross-sectional view of the backlight box 60, taken along line X-X in FIG. 3A. Meanwhile, the light transmitting diffusion plate 63 is not shown in FIG. 3A for illustrating the state of light distribution of red, green and blue light beams, radiated from the light emitting diodes 61.

For eliminating variations in color and brightness of the white light, obtained on color mixing by the light transmitting/diffusing plate 63, the light beams of the respective colors, getting to the light transmitting/diffusing plate 63 from the light emitting diodes 61, need to be superposed together sufficiently, as shown in FIG. 4A. This is made possible by sufficiently increasing the thickness of the casing 60a to provide for a sufficient distance between the light emitting diodes 61 and the light transmitting/diffusing plate 63, as shown in FIG. 4B. Thus, the backlight box 60, employing the light emitting diodes 61 as the light source, is of a marked thickness, even as compared with the backlight box 50 employing the fluorescent lamps 51 as the light source, because the casing 60a has to be of an increased thickness. Hence, the backlight box 60, employing the light emitting diodes 61 as the light source, suffers from the problem that it is further deterrent to reducing the thickness of the liquid crystal device.

DISCLOSURE OF THE INVENTION

Task to be Solved by the Invention

In view of the above depicted status of the art, it is an object of the present invention to provide a backlight device in which variations in color or brightness of white light, illuminating the liquid crystal display panel, may be diminished and which is reduced in thickness, and a liquid crystal display device employing this backlight device.

Means for Solving the Problem

For accomplishing the above object, the present invention provides a subjacent type backlight device for illuminating a liquid crystal display panel comprising a light source arranged in a casing opened in a light radiating surface, so that the light source faces the light radiating surface, with the light source radiating light towards the light radiating surface, light transmitting reflecting means arranged in the casing for delimiting a space inclusive of the light source, with the light transmitting reflecting means transmitting a fraction of the incident light and reflecting another fraction of the incident light, and transmitting diffusing means arranged on the light radiating surface of the casing for diffusing the light transmitted through the light transmitting reflecting means and causing surface light radiation. The casing has an inner surface as a reflecting surface for reflecting the incident light. A portion of light radiated from the light source is internally reflected by the light transmitting reflecting means and by the reflecting surface in the space delimited in the casing by the light transmitting reflecting means. The light portion is then transmitted through the light transmitting reflecting means.

For accomplishing the above object, the present invention also provides a liquid crystal display device including a light transmitting liquid crystal display panel and a subjacent type backlight device for illuminating a liquid crystal display panel, in which the backlight device comprises a light source arranged in a casing opened in a light radiating surface, so that the light source faces the light radiating surface, the light source radiating light towards the light radiating surface, light transmitting reflecting means arranged in the casing for delimiting a space inclusive of the light source, with the light transmitting reflecting means transmitting a fraction of the incident light and for reflecting another fraction of the incident light, and transmitting diffusing means arranged on the light radiating surface of the casing for diffusing the light transmitted through the light transmitting reflecting means and for causing surface light radiation. The casing has an inner surface as a reflecting surface for reflecting the incident light. A portion of light radiated from the light source is internally reflected by the light transmitting reflecting means and by the reflecting surface in the space delimited in the casing by the light transmitting reflecting means. The light portion is then transmitted through the light transmitting reflecting means.

EFFECT OF THE INVENTION

According to the present invention, the subjacent type backlight device, illuminating the liquid crystal display panel, includes a light source arranged in a casing opened in a light radiating surface, so that the light source faces the light radiating surface, with the light source radiating light towards the light radiating surface, light transmitting reflecting means arranged in the casing for delimiting a space inclusive of the light source, with the light transmitting reflecting means transmitting a fraction of the incident light and for reflecting another fraction of the incident light, and transmitting diffusing means arranged on the light radiating surface of the casing for diffusing the light transmitted through the light transmitting reflecting means and for causing surface light radiation.

On the inner surface of the casing, there is provided a reflecting surface for reflecting the incident light, and a portion of light radiated from the light source is internally reflected by the light transmitting reflecting means and by the reflecting surface in the space delimited in the casing by the light transmitting reflecting means. The light portion is then transmitted through the light transmitting reflecting means for surface light radiation.

By so doing, the portion of light radiated from the light source is repeatedly reflected in the space delimited in the casing by the transmitting reflecting means so as to be then transmitted through the light transmitting reflecting means to fall on the transmitting diffusing means. Consequently, the light radiated from the light source is spread to a wide zone before being incident on the transmitting diffusing means, so that, even in case the distance between the light source and the transmitting diffusing means is decreased to reduce the thickness of the backlight device, there may be obtained the favorable effect in diminishing the variations in color or brightness in surface light radiation from the light source which is equivalent to that in case the light source and the transmitting diffusing means are separated apart sufficiently from each other.

Viz., in case the red light emitting diode, emitting red light, the green light emitting diode, emitting green light and the blue light emitting diode, emitting blue light, are used as the light sources, the conventional practice has been to separate the light sources and the transmitting diffusing means sufficiently for mixing the colors of the light to yield white color light diminished in variations in color or brightness. According to the present invention, in which the light transmitting reflecting means is provided within the casing, it is possible to reduce the variations in color or brightness without providing for the sizable separation between the light source and the transmitting diffusing means.

If, in case the light source is the fluorescent tube, the separation between the fluorescent tube and the transmitting diffusing means is diminished to reduce the thickness of the backlight device, by providing the light transmitting reflecting means in the casing, it is possible to prevent the shade of the fluorescent tube from falling on and affecting the transmitting diffusing means to diminish the variations in color or brightness further.

Moreover, when the light transmitting reflecting means is provided in the casing, the light radiated from a given light emitting diode is spread over a wide area before being incident on the transmitting diffusing means, and hence the light radiated from the light source may be prevented from being locally incident on the transmitting diffusing means, with the result that the number of light sources used may be reduced to lower the cost significantly.

Furthermore, by providing the light transmitting reflecting means in the casing, the light radiated from the same light source is incident on the transmitting diffusing means in a widely spread state. Hence, sufficient color mixing may be achieved even if the diffusing effect of the transmitting diffusing means is lowered, with the consequence that the transmitting diffusing means may be of a reduced thickness, such as to suppress the light utilization efficiency from being lowered.

BRIEF DESCRIPTION OF THE DRAWINGS

FIGS. 1A and 1B show a conventional backlight box employing fluorescent lamps as light source, FIG. 1A being a front view of the backlight box and FIG. 1B being a cross-sectional view taken along line XX of FIG. 1A.

FIG. 3A is a front view showing the state of distribution of light radiated from the light emitting diodes to get to the light transmitting/diffusing plate, in case the thickness of the backlight box is reduced, and FIG. 3B is a cross-sectional view taken along line XX of FIG. 3A.

BEST MODE FOR CARRYING OUT THE INVENTION

Figures 2A, 2B:
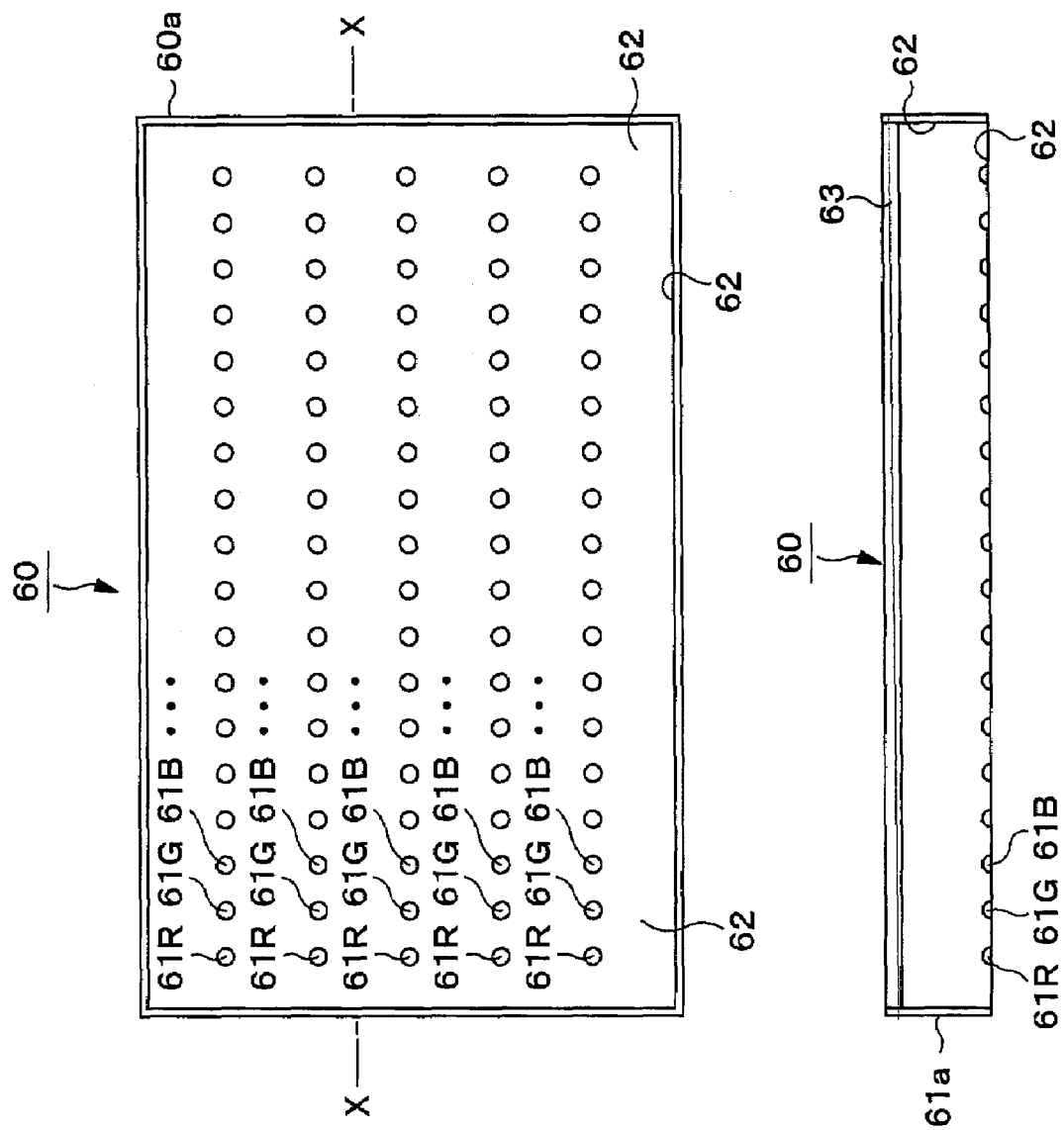
FIGS. 2A and 2B show a conventional backlight box employing light emitting diodes as light source, FIG. 2A being a front view of the backlight box and FIG. 2B being a cross-sectional view taken along line XX of FIG. 2A.
Figure 4A:
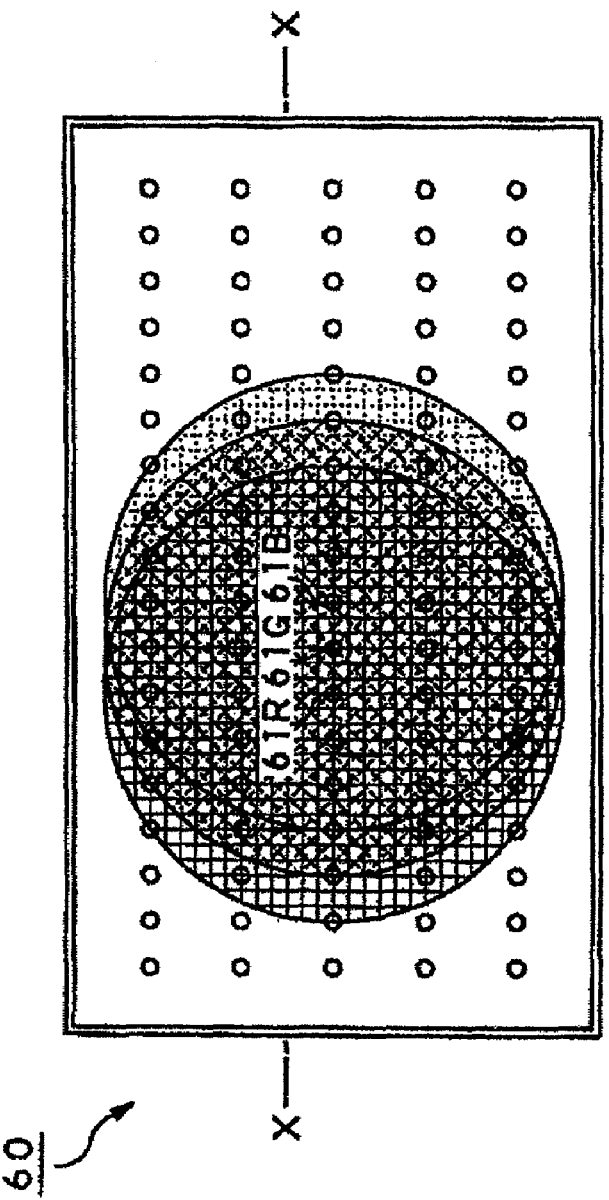
FIG. 4A is a front view showing the state of distribution of light radiated from the light emitting diodes to get to the light transmitting/diffusing plate, in case the thickness of the backlight box is increased.
Figure 4B:
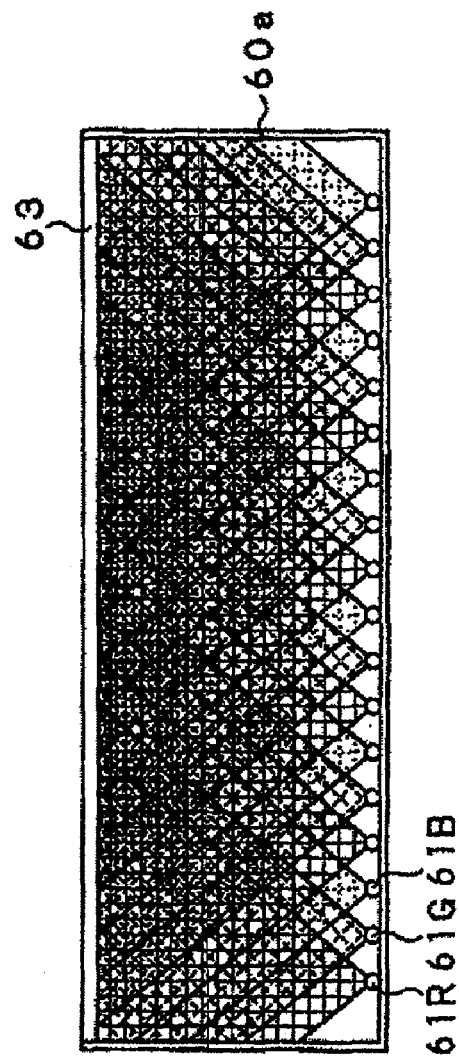
FIG. 4B is a cross-sectional view taken along line X-X of FIG. 3A.

Referring to the drawings, the best mode for carrying out the present invention will now be explained in detail. It should be noted that the present invention is not limited to the embodiment as now explained and may optionally be modified without departing from the scope of the invention.

Figure 5:
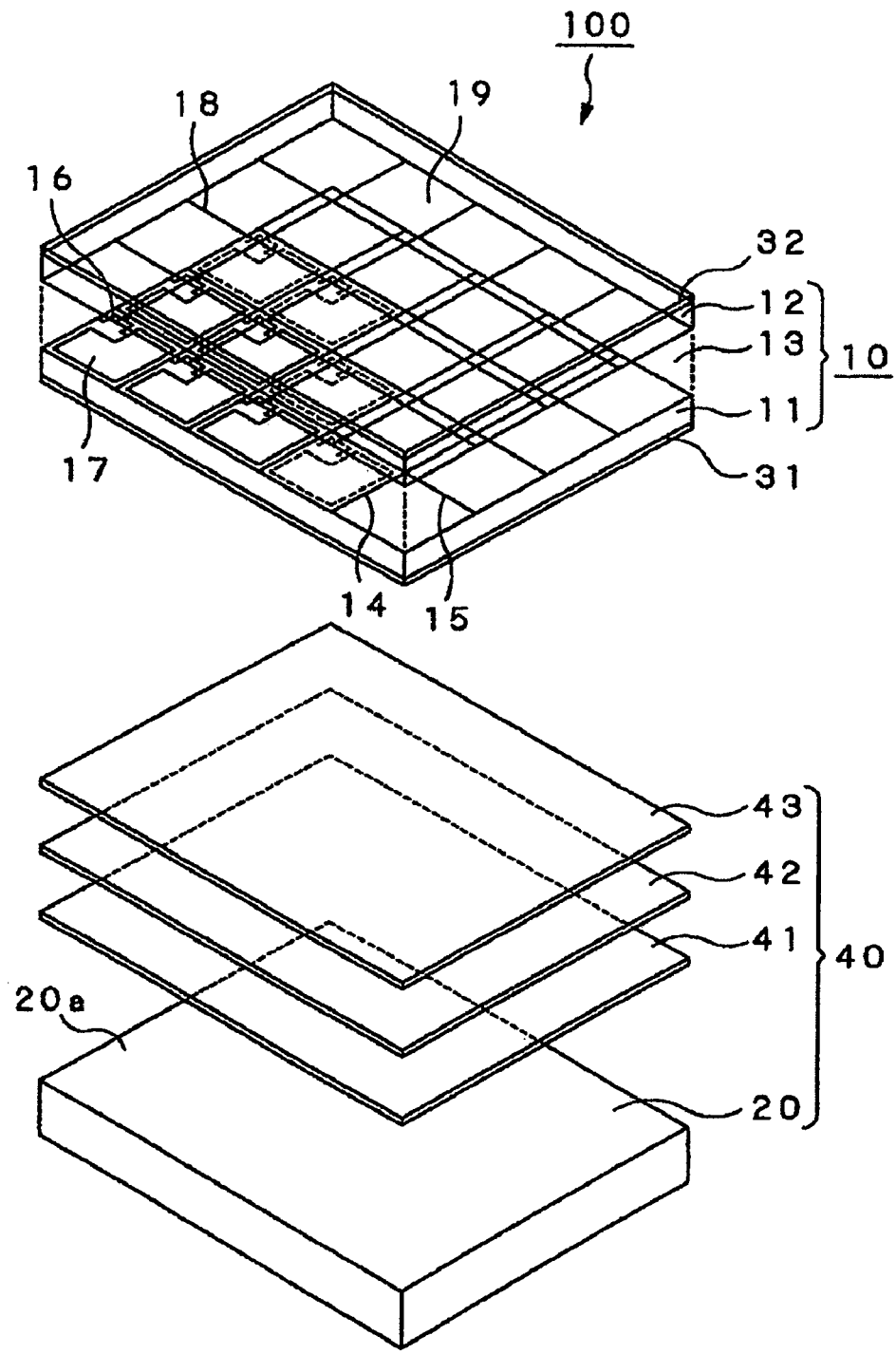
FIG. 5 illustrates a color liquid crystal display device, shown as the best mode for carrying out the invention.

The present invention is applied to a subjacent backlight type color liquid crystal display device 100, configured for example as shown in FIG. 5.

The subjacent backlight type color liquid crystal display device 100 is made up by a light transmitting type color liquid crystal display panel 10 and a backlight box 40 provided to the backside of the color liquid crystal display panel 10. This color liquid crystal display device 100 may be provided with a receiver for receiving surface waves or satellite waves, such as analog tuner or digital tuner, a picture signal processing unit or an audio signal processing unit for processing picture signals or audio signals received by the receiver, respectively, and an audio signal outputting unit for outputting speech signals, obtained on processing by a speech signal processing unit, such as a loudspeaker.

The light transmitting type color liquid crystal display panel 10 is made up by two transparent substrates, formed of glass (a TFT substrate 11 and a counter-electrode substrate 12), and which are arranged facing each other, with a gap in-between, and a liquid crystal layer 13 of e.g. twisted nematic liquid crystal, enclosed in the gap. The TFT substrate 11 is provided with signal lines 14 and scanning lines 15, arranged in a matrix pattern, thin-film transistors 16, as switching elements, arranged at the points of intersection of the signal lines 14 and the scanning lines 15, and pixel electrodes 17. The thin-film transistors 16 are sequentially selected by the scanning lines 15 to write picture signals, supplied from the signal lines 14, in the associated pixel electrodes 17. On the inner surfaces of the counter-electrode substrate 12 are formed counter-electrodes 18 and color filters 19.

Figure 6:
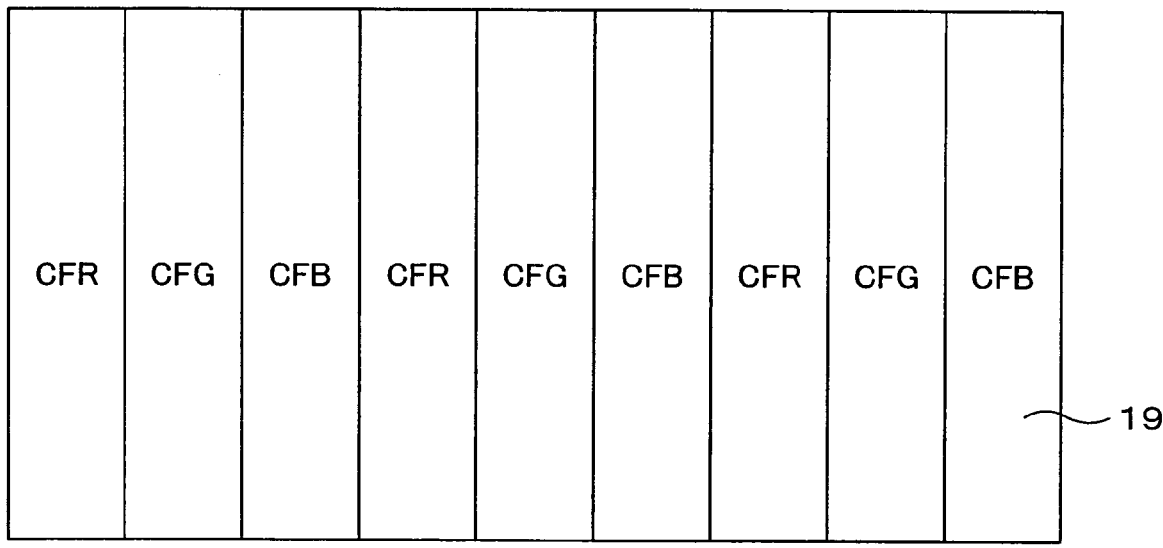
FIG. 6 illustrates a color filter of a color liquid crystal display panel provided to the color liquid crystal display device.

The color filter 19 is now explained. The color filter 19 is divided into plural segments for each pixel. For example, each color filter 19 is divided into three segments, namely a red filter CFR, a green filter CFG and a blue filter CFB, for three prime colors, as shown in FIG. 6. Among the color filter arraying patterns, there are a delta pattern and a square pattern, besides the striped pattern, as shown in FIG. 6.

With this color liquid crystal display device 100, the above-described light transmitting type color liquid crystal display panel 10 is sandwiched between two polarizing plates 31, 32, and is driven in accordance with an active matrix system, as the display panel is irradiated with white light by the backlight box 40 from the back side, such as to display a desired full-color picture.

The backlight box 40 illuminates the color liquid crystal display panel 10 from its back side by surface light emission and irradiation. Referring to FIG. 5, the backlight box 40 is made up by a box unit 20, provided with an opening 20a for radiating light, emitted from a light source, as later explained, to outside, as well as a light transmitting/diffusing plate 41, a brightness raising film 42 and another light transmitting/diffusing plate 43, arranged in this order from the bottom side in the opening 20a.

The light transmitting/diffusing plates 41, 43 operate for diffusing and mixing the light beams, radiated from the opening 20a, into even white light free from variations in brightness and color in surface light radiation. The brightness raising film 42 causes the light, radiated from the opening 20a, to be oriented along the normal line to the opening 20a to raise the front surface brightness in surface light radiation. Meanwhile, it is not mandatory to provide each one of the light transmitting/diffusing plate 43 and the brightness raising film 42, and whether or not these components are used or the number of these components used may be suitably changed depending on the total performance of the color liquid crystal display device 100.

Figure 7:
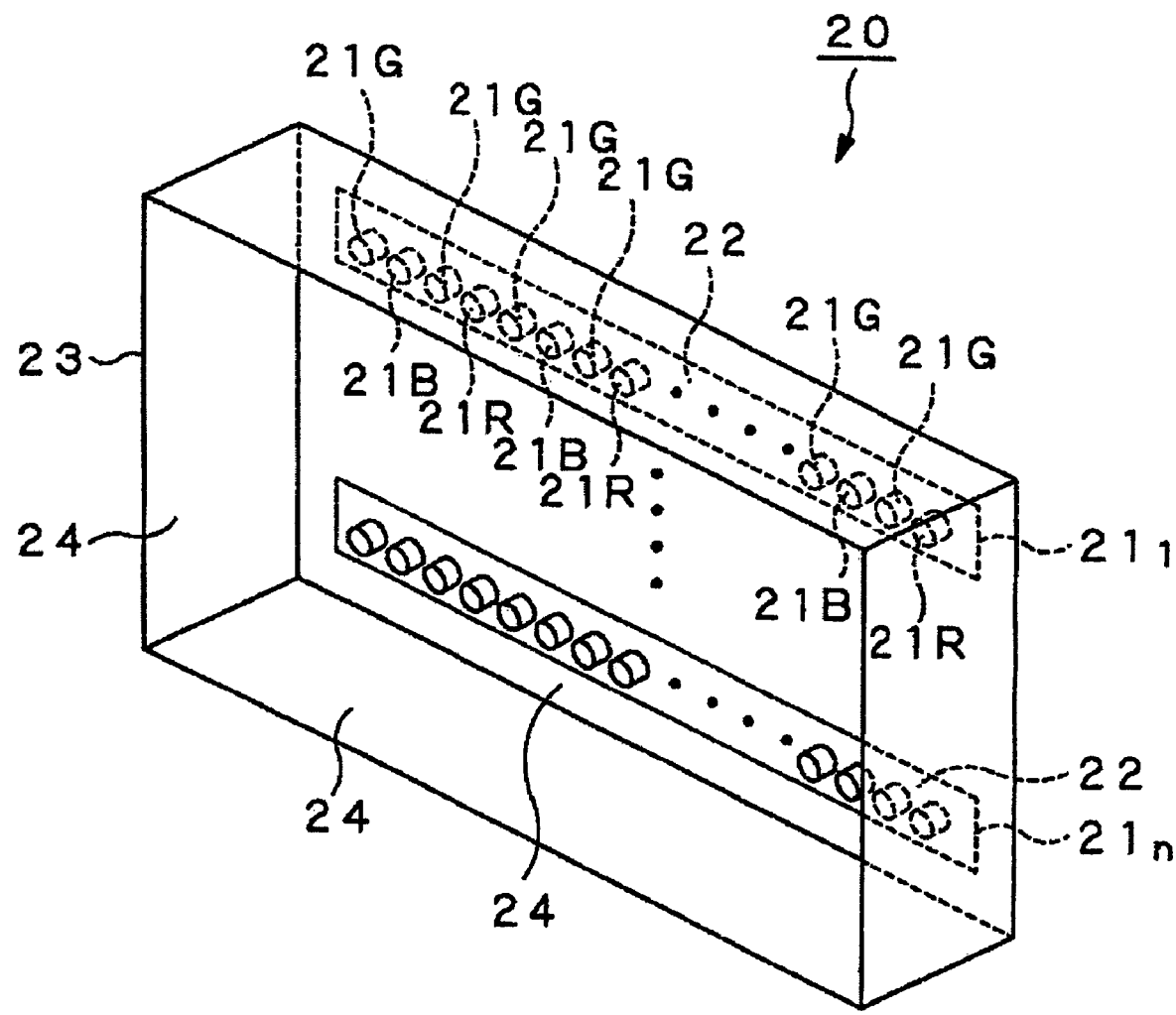
FIG. 7 illustrates a backlight box provided to the color liquid crystal display device.
Figure 8:
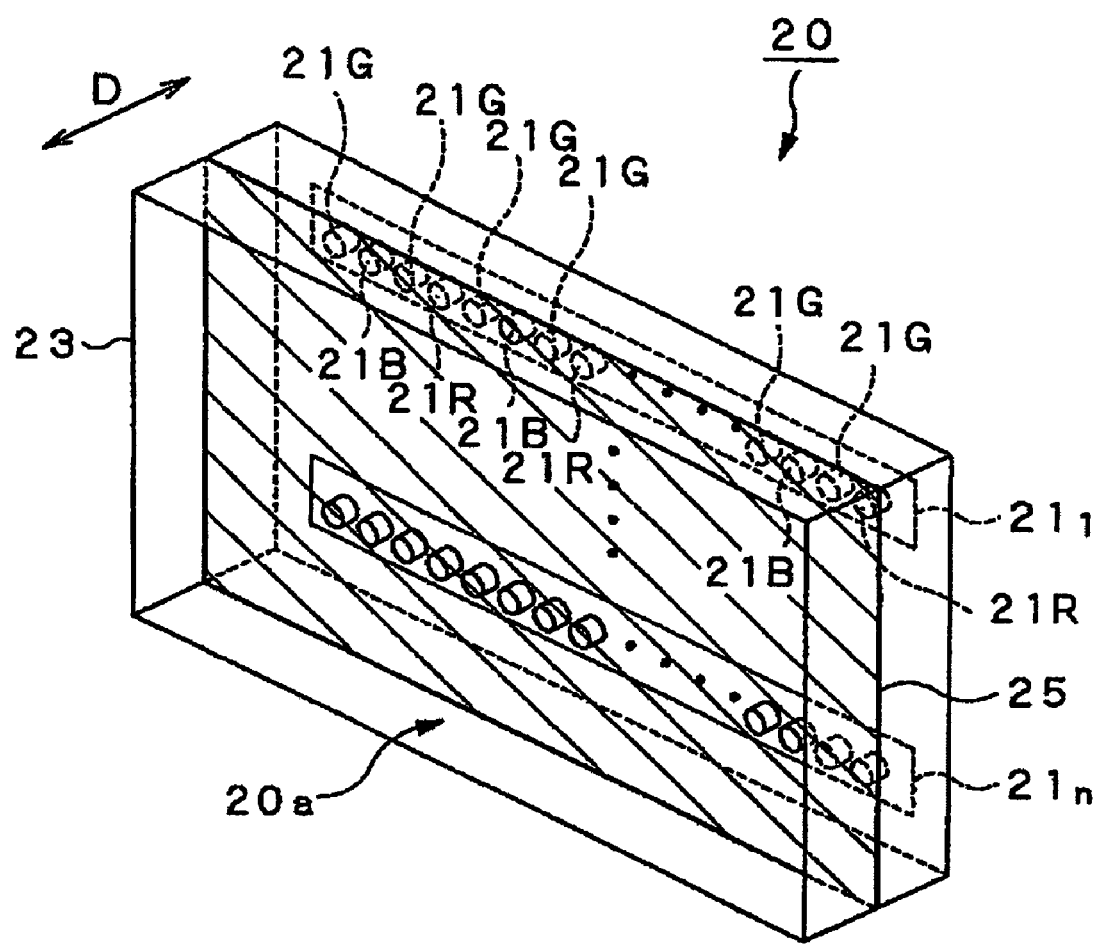
FIG. 8 illustrates a backlight box provided to the color liquid crystal display device.

FIGS. 7 and 8 schematically show the box unit 20. Referring to FIG. 7, the box unit 20 uses a red light emitting diode 21R, a green light emitting diode 21G and a blue light emitting diode 21B, as light sources. Meanwhile, if, in the explanation to follow, the red light emitting diode 21R, green light emitting diode 21G and the blue light emitting diode 21B are referred to collectively, these are simply referred to as light emitting diodes 21.

The light emitting diodes 21 are arrayed in a row in a desired sequence on the substrate to form a light emitting diode unit 21n, where n is a natural number, as shown in FIG. 7. The sequence of arraying the light emitting diodes on the substrate 22 may, for example, be such that green light emitting diodes 21G are arrayed at an equal interval from each other, and red light emitting diode 21R and blue light emitting diode 21B are arranged alternately between neighboring ones of the green light emitting diodes 21G, as shown in FIG. 7.

A plural number of the light emitting diode units 21n are arrayed in a box casing 23, as a casing of the box unit 20, depending on the size of the color liquid crystal display panel 10, illuminated by the backlight box 40.

The light emitting diode units 21n in the box casing 23 may be arrayed in the box casing 23 so that the longitudinal direction of the light emitting diode units 21n is the horizontal direction, as shown in FIG. 7. Alternatively, the light emitting diode units may be arrayed so that the longitudinal direction of the light emitting diode units 21n is the horizontal direction, in a manner not shown, or partially in the horizontal direction and partially in the vertical direction, in a manner again not shown.

The technique of arraying the light emitting diode units 21n in the horizontal direction or in the vertical direction is the same as that of arraying the CCFL, used thus far as the light source of the backlight device, and hence the accumulated designing know-how may be exploited to reduce the cost or time until manufacture.

The inner lateral sides of the box casing 23 and the inner bottom side thereof on which to array the light emitting diode units 21n are lined with a reflective surface 24 having a reflectance of approximately 100% and exhibiting diffusive effects. This reflective surface 24 internally reflects the light, radiated from the light emitting diodes 21, within the box casing 23.

At a height-wise position corresponding to about one half of a thickness D of the box casing 23, within the box casing 23, a light transmitting/reflecting plate 25 is mounted so as to be parallel to the opening 20a and so as to cover the light emitting diode units 21n as the light sources, as shown in FIG. 8. This light transmitting/reflecting plate 25 has the function of partially transmitting and partially reflecting the incident light. On this light transmitting/reflecting plate 25 is incident the light radiated from the light emitting diodes 21 (direct light) or the light radiated from the light emitting diodes 21 and internally reflected by the reflective surface 24 (reflected light).

By providing the light transmitting/reflecting plate 25 within the box casing 23, part of light beams of respective colors, radiated from the light emitting diodes 21, in the space confined by the light transmitting/reflecting plate 25, cannot pass through the light transmitting/reflecting plate 25, and can pass therethrough only after repeated internal reflection a plural number of times by the reflective surface 24 and the light transmitting/reflecting plate 25.

After repeated internal reflection, the light beams are incident on the light transmitting/reflecting plate 25 at respective different positions and respective random angles of incidence. Consequently, the respective color light beams, incident on the light transmitting/reflecting plate 25 after internal reflection repeated a number of times, are ultimately passed through the entire surface of the light transmitting/reflecting plate 25 to fall on the light transmitting/diffusing plate 41 over a wide range, even though these light beams are radiated from the same light emitting diode 21.

That is, when the light transmitting/reflecting plate 25 is provided in the box casing 23, the area of illumination of light incident on the light transmitting/diffusing plate 41 is enhanced, as in the case where the box casing 23 is increased in thickness to provide a sufficient distance between the light emitting diodes 21 and the light transmitting/diffusing plate 41, with the result that there may be obtained white light reduced in variations in color and brightness. Hence, the white light, radiated from the backlight box 40 to illuminate the color liquid crystal display panel, is of uniform color and uniform brightness free from variations in color and brightness.

The light transmitting/reflecting plate 25, provided in the box casing 23, will be explained in detail subsequently.

The white light, radiated after color mixing from the box unit 20, is passed through the light transmitting/diffusing plate 41, brightness raising film 42 and the other light transmitting/diffusing plate 43 to illuminate the color liquid crystal display panel 10 from its back surface.

Figure 9:
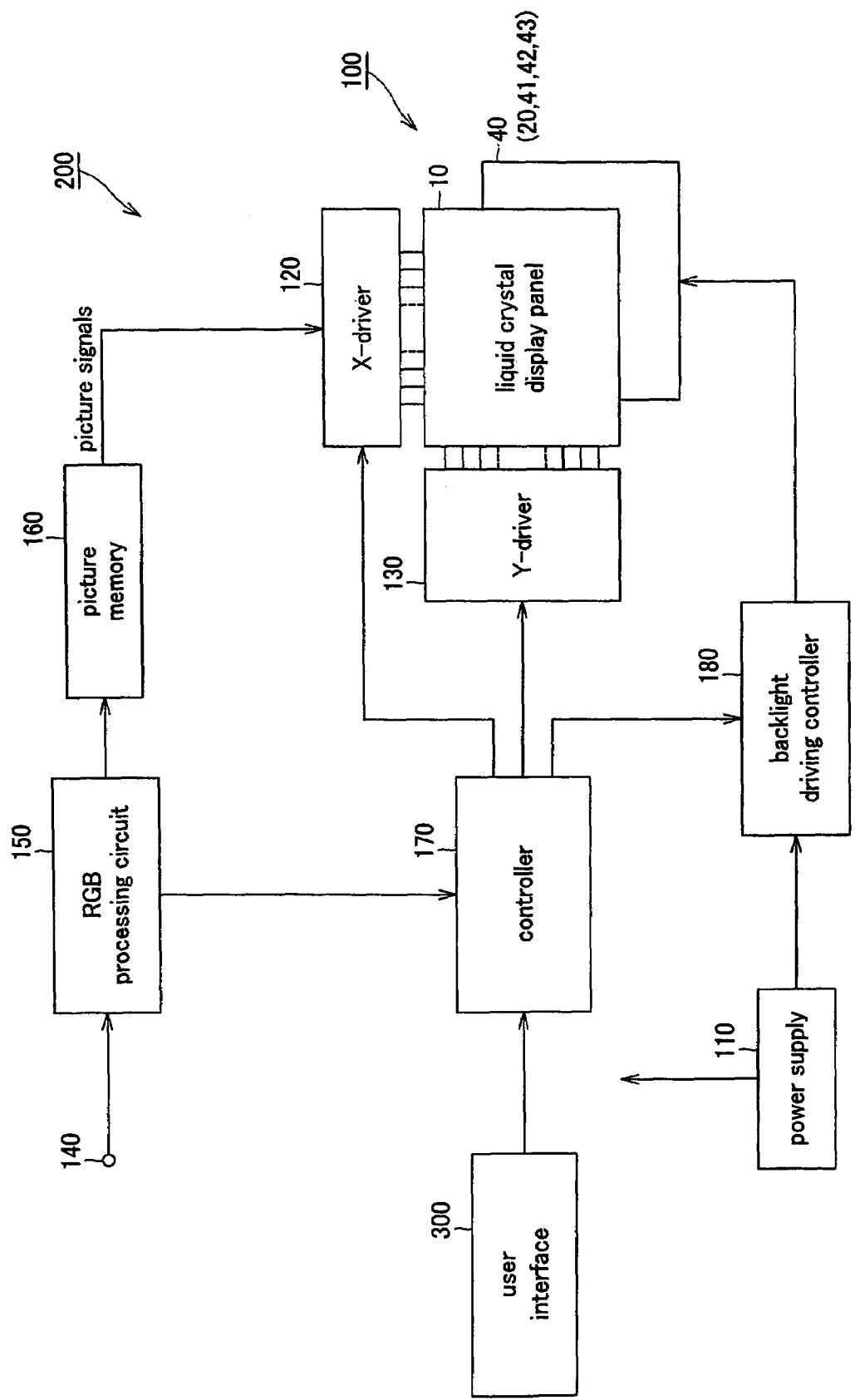
FIG. 9 is a block diagram of a driving circuit for driving the color liquid crystal display device.

This liquid crystal display device 100 is driven by, for example, a driving circuit 200 shown in FIG. 9.

This driving circuit 200 includes a power supply unit 110 for supplying a driving power supply for the color liquid crystal display panel 10 and the box unit 20, an X driver circuit 120 and a Y driver circuit 130, driving the color liquid crystal display panel 10, and an RGB processing circuit 150, supplied via input terminal 140 with picture signals from outside and with picture signals which are received via a receiving unit, not shown, provided to the liquid crystal display device 100, and which are processed by a picture signal processing unit. The driving circuit also includes a picture memory 160 and a controller 170, connected to the RGB processing circuit 150, and a backlight driving controller 180 for controlling the driving of the box unit 20 of the backlight box 40.

In this driving circuit 200, the picture signals, entered via input terminal 140, are processed by the RGB processing circuit 150, such as with chroma processing. The picture signals are then transformed from the state of composite signals into the state of RGB separate signals, convenient for driving the color liquid crystal display panel 10, and are supplied in this state to the controller 170, while being also supplied via picture memory 160 to the X driver circuit 120.

The controller 170 also controls the X driver circuit 120 and the Y driver circuit 130, at a preset timing consistent with the RGB separate signals, and drives the color liquid crystal display panel 10 with the RGB separate signals supplied via picture memory 160 to the X driver circuit 120, to display a picture corresponding to the above RGB separate signals.

The backlight driving controller 180 generates pulse width modulated signals (PWM signals) from the voltage supplied from the power supply unit 110, to drive the respective light emitting diodes 21, operating as light sources for the box unit 20. In general, the light emitting diode has such characteristics that its color temperature depends on the operating current. Thus, for realization of faithful color reproduction, that is, constant color temperature, with desired luminance, it is necessary to drive the light emitting diodes 21, using the pulse width modulated signals, to suppress changes in color.

A user interface 300 is used for selecting a channel, received by the receiving unit, not shown, for adjusting the volume of the output voice from a voice outputting unit, not shown, for adjusting the luminance of the white light from the box unit 20, illuminating the color liquid crystal display panel 10, and for adjusting the white balance.

For example, if the user has adjusted the brightness from the user interface 300, a brightness control signal is transmitted via controller 170 of the driving circuit 200 to the backlight driving controller 180. This backlight driving controller 180 is responsive to this brightness control signal to vary the duty ratio of the pulse width modulated signal for each of the red light emitting diode 21R, green light emitting diode 21G and the blue light emitting diode 21B to effectuate driving control of the red light emitting diode 21R, green light emitting diode 21G and the blue light emitting diode 21B.

In the Embodiments 1 to 3, that follow, the light transmitting/reflecting plate 25 will be explained specifically.

FIRST EMBODIMENT

Figure 10:
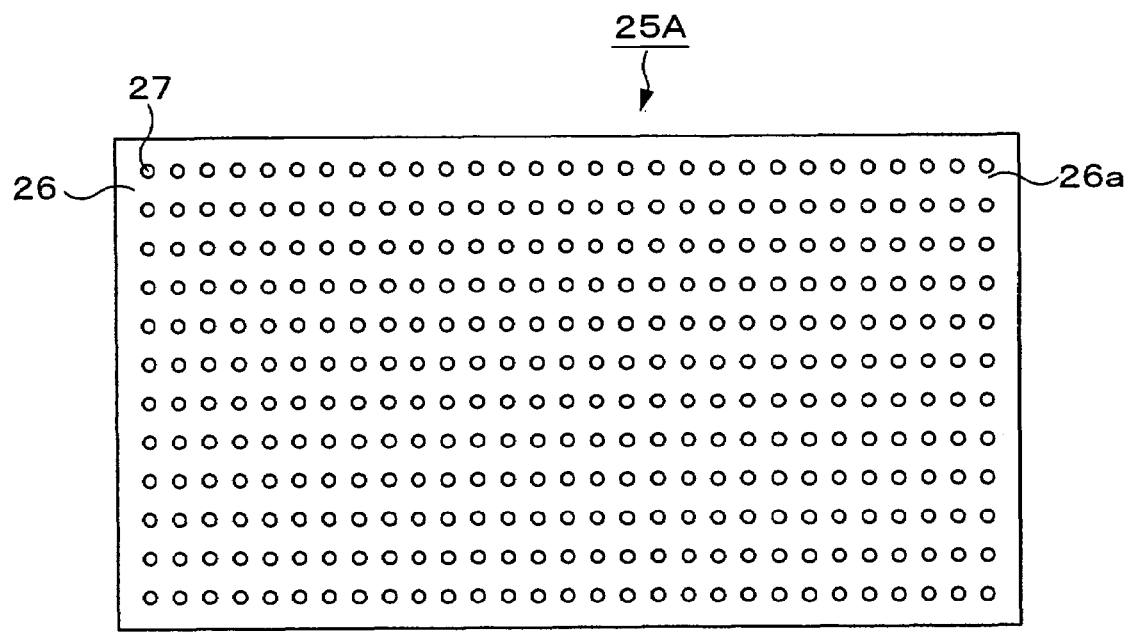
FIG. 10 illustrates a reflecting/transmitting plate obtained on patterning a total reflection mirror of a first embodiment on a total light transmission plate.

First, as the light transmitting/reflecting plate 25, such a light transmitting/reflecting plate 25A, comprised of a full transmitting plate 26, on one major surface 26a of which a plural number of dot-shaped total reflection mirrors 27, adapted for reflecting the light, incident at a preset angle of incidence, by total reflection, are formed by patterning, as shown in FIG. 10, may be thought of. The full transmitting plate 26 is a plate-shaped or film-shaped transparent member, formed of, for example, acrylic resin or polycarbonate, and which is adapted for transmitting the incident light in its entirety. The number of the total reflection mirrors 27 on the full transmitting plate 26 is determined by the proportions of transmission and reflection of the light incident on the light transmitting/reflecting plate 25.

Figure 11:
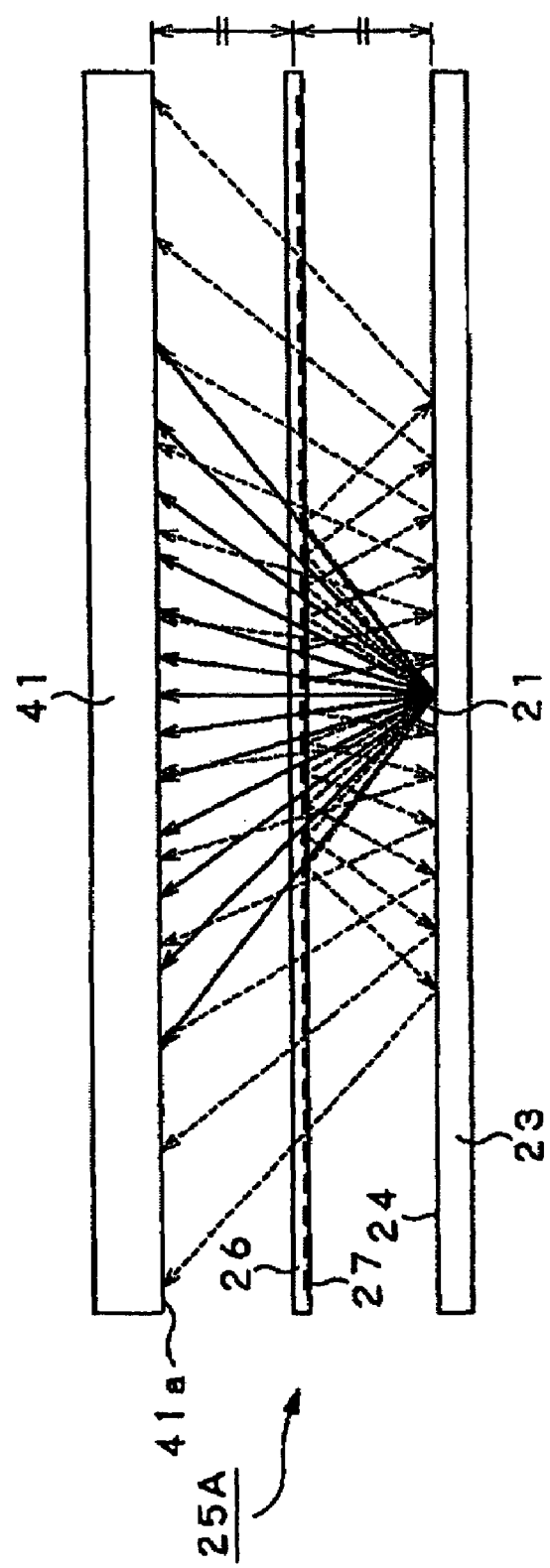
FIG. 11 illustrates a light path of light radiated from the light emitting diodes in case there is provided the reflecting/transmitting plate.

Referring to FIG. 11, the light transmitting/reflecting plate 25A is arranged at a location about halfway between the reflective surface 24 on the bottom of the box casing 23 and a light incident surface 41a of the light transmitting/diffusing plate 41, within the box unit 20 of the backlight box 40, so that one major surface 26a thereof carrying the total reflection mirrors 27 will face the light emitting diodes 21.

With the light transmitting/reflecting plate 25A, mounted as described above, the light radiated from the light emitting diodes 21 follows the light path as explained below.

First, the light emitted from the light emitting diodes 21 is incident on the light transmitting/reflecting plate 25A. Of the light incident on the light transmitting/reflecting plate 25A, the light not incident on the total reflection mirrors 27 but incident on the full transmitting plate 26 is directly transmitted through the light transmitting/reflecting plate 25A so as to fall on the light transmitting/diffusing plate 41, as indicated by a solid-line arrow in FIG. 11, and so as to be diffused within the light transmitting/diffusing plate 41.

On the other hand, the light incident on the total reflection mirrors 27 undergoes total reflection, depending on the angle of incidence, to fall on the reflective surface 24 of the box casing 23. The light incident on the reflective surface 24 is thereby reflected to fall again on the light transmitting/reflecting plate 25A, as indicated by broken line arrow in FIG. 11. In similar manner, the light incident on the light transmitting/reflecting plate 25A is either transmitted therethrough or undergoes total reflection. Of the light subjected to total light reflection by the total reflection mirrors 27, part of the light undergoes multiple reflection between the reflective surface 24 and the total reflection mirrors 27. However, such light ultimately is incident on the full transmitting plate 26 and transmitted through the light transmitting/reflecting plate 25A.

Thus, it may be seen that, by providing the light transmitting/reflecting plate 25A within the box casing 23, the area of illumination of the light transmitting/diffusing plate 41 by the light radiated from the light emitting diodes 21 and getting to the light incident surface 41a of the light transmitting/diffusing plate 41 through the light transmitting/reflecting plate 25A becomes larger than the area of illumination by the direct light, as indicated by solid-line arrows in FIG. 11, by an amount indicated by dotted-line arrows, as indicated in FIG. 11.

Figure 12:
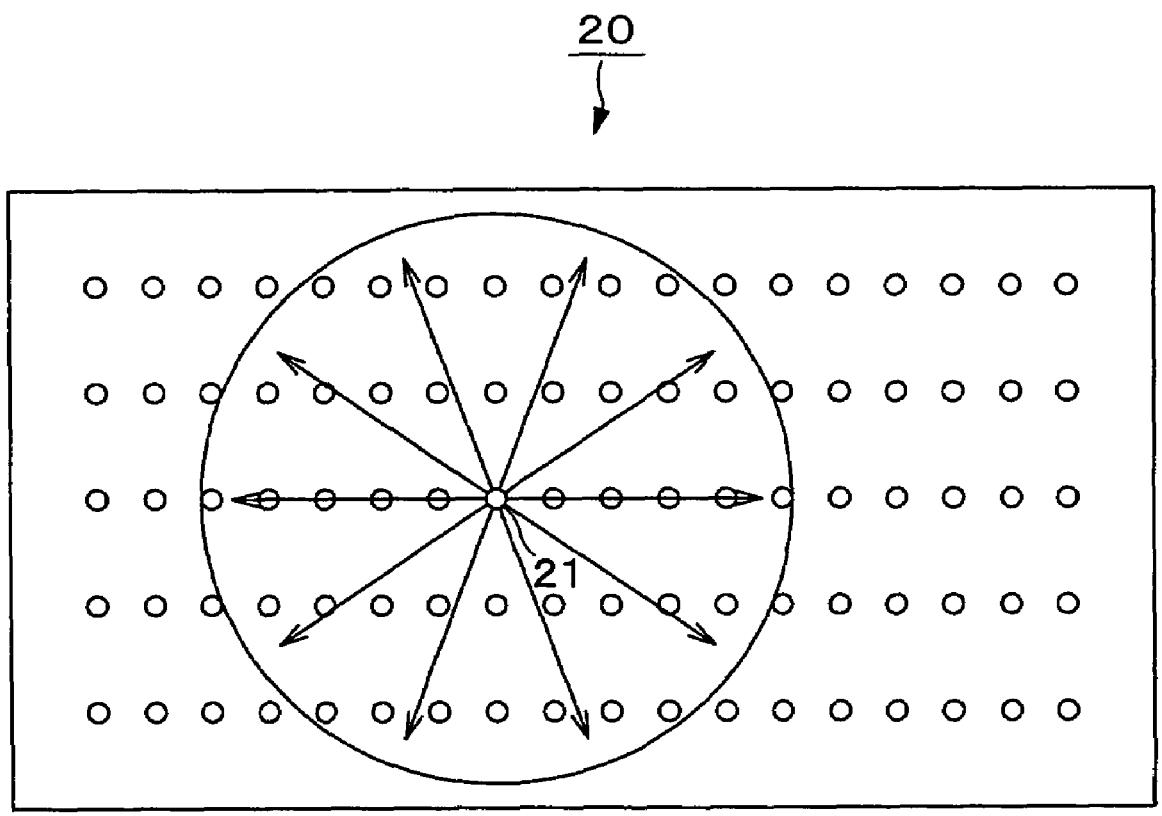
FIG. 12 illustrates the favorable effect of providing the reflecting/transmitting plate.

The foregoing shows that a favorable effect may be achieved which is comparable to a case where the light transmitting/reflecting plate 25A is not provided in the box casing 23 of the backlight box 40 to provide for a sufficient thickness of the box casing 23 and a sufficient separation between the light emitting diodes 21 and the light incident surface 41a of the light transmitting/diffusing plate 41, whereby the light radiated from the light emitting diodes 21 becomes concentrically spread before getting to the light transmitting/diffusing plate 41 and thereby becomes mixed to diminish variations in color and brightness on the light transmitting/diffusing plate 41, as shown in FIG. 12.

Since the reflectance of the reflective surface 24 of the box casing 23 is approximately 100%, as described above, approximately 100% of light radiated from the light emitting diodes 21 is ultimately transmitted through the light transmitting/reflecting plate 25A, by reflection on the light transmitting/reflecting plate 25A and on the reflective surface 24, so as to fall on the light incident surface 41a of the light transmitting/diffusing plate 41.

Consequently, with the backlight box 40, in the box casing 23 of which there is provided the light transmitting/reflecting plate 25A, it is possible to illuminate the white color with appreciably diminished variations in color and brightness on the color liquid crystal display panel.

Meanwhile, the higher the proportion of total area of the total reflection mirrors 27 formed on the full transmitting plate 26, the more uniform is the distribution of brightness and the lesser is the variation in color or brightness. However, if the proportion of the total reflection mirrors 27 is excessive, the number of times of multiple reflection in the box casing 23 is increased, thus possibly leading to attenuation of light incident on the light transmitting/diffusing plate 41. The reason is that the reflectance of the reflective surface 24 is not completely 100% and that the light incident on the light emitting diodes 21 is thereby absorbed.

Hence, the utilization efficiency of light radiated from the backlight box 40 may be raised by increasing the reflectance of the reflective surface 24 and by diminishing the area of absorption of the light radiated from the backlight box 40.

It is noted that the dot-shaped total reflection mirrors 27 are formed at even intervals in a matrix pattern over the entire surface of the major surface 26a of the full transmitting plate 26. However, the total reflection mirrors 27 may be formed to a pattern different from the above pattern. Since the variations in color and brightness are affected by the number and the locations of the light emitting diodes, the density of distribution of the total reflection mirrors 27 formed on the full transmitting plate 26 may be changed, or the dot area may partially be changed, by way of performing flexible adjustment for diminishing the variations in color and brightness

SECOND EMBODIMENT

The light transmitting/reflecting plate 25 may be configured as a light transmitting/reflecting plate 25B, formed by a multi-layered dielectric film on a substrate, which multi-layered dielectric film is comprised of at least one thin film of a low refractive index material and at least one thin film of a high refractive index material, thereby controlling the reflectance (transmittance). The reflectance may be optionally adjusted by the components of the low refractive index material and the high refractive index material, and/or the number of the thin films.

Figure 13:
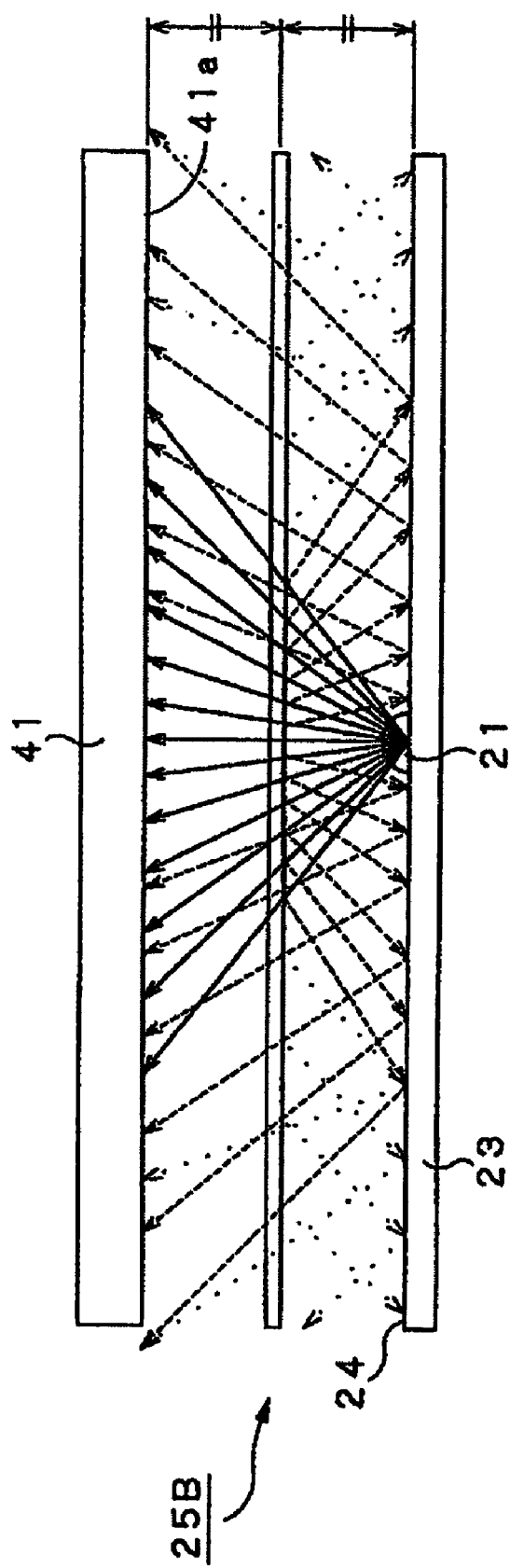
FIG. 13 shows a path of light radiated from the light emitting diodes of the reflecting/transmitting plate on which has been vapor-deposited a multi-layered dielectric film shown as a second embodiment.

Similarly to the light transmitting/reflecting plate 25A, shown in the first embodiment, this light transmitting/reflecting plate 25B is arranged at a position approximately halfway between the reflective surface 24 on the bottom surface of the box casing 23 and the light incident surface 41a of the light transmitting/diffusing plate 41, within the box casing 23 of the backlight box 40, as shown in FIG. 13.

With the light transmitting/reflecting plate 25B, mounted as described above, the light radiated from the light emitting diodes 21 follows the light path as explained below.

First, the light emitted from the light emitting diodes 21 are incident on the light transmitting/reflecting plate 25B. The light incident on the light transmitting/reflecting plate 25B is transmitted or reflected in proportions relating to the reflectance of the light transmitting/reflecting plate 25B.

The light transmitted through the light transmitting/reflecting plate 25B is incident on the light transmitting/diffusing plate 41, as indicated by a solid-line arrow in FIG. 13, for diffusion therein.

On the other hand, the light reflected by the light transmitting/reflecting plate 25B is incident on and reflected by the reflective surface 24 in the box casing 23 so as to be again incident on the light transmitting/reflecting plate 25B. The light incident on the light transmitting/reflecting plate 25B is transmitted therethrough (as indicated by a broken-line arrow in FIG. 13) and reflected (as indicated by a dotted-line arrow in FIG. 13) in proportions related to the reflectance of the light transmitting/reflecting plate 25B. In similar manner, the light incident on the light transmitting/reflecting plate 25B is transmitted and reflected. Part of the light reflected by the light transmitting/reflecting plate 25B undergoes multiple reflection between the reflective surface 24 and the light transmitting/reflecting plate 25B until attenuation.

Thus, it may be seen that, by providing the light transmitting/reflecting plate 25B within the box casing 23, the area of illumination of the light transmitting/diffusing plate 41 by the light radiated from the light emitting diodes 21 and getting to the light incident surface 41a of the light transmitting/diffusing plate 41 through the light transmitting/reflecting plate 25B becomes larger than the area of illumination by the direct light indicated by a solid-line arrow in FIG. 13, by an amount indicated by a broken-line arrow and a dotted-line arrow, as indicated in FIG. 13.

The foregoing shows that a favorable effect may be achieved which is comparable to a case wherein the light transmitting/reflecting plate 25B is not provided in the box casing 23 of the backlight box 40 to provide for a sufficient thickness of the box casing 23 and a sufficient separation between the light emitting diodes 21 and the light incident surface 41a of the light transmitting/diffusing plate 41, whereby the light radiated from the light emitting diodes 21 becomes concentrically spread before getting to the light transmitting/diffusing plate 41 and thereby becomes mixed to diminish variations in color and brightness on the light transmitting/diffusing plate 41, as shown in FIG. 12.

The light incident on and reflected by the light transmitting/reflecting plate 25B keeps on to be reflected, as it is also transmitted, until it is completely attenuated, as also shown in FIG. 13. Hence, with use of the light transmitting/reflecting plate 25B, the light radiated from the sole light emitting diode 21 becomes diffused over a zone wider than in the case of using the light transmitting/reflecting plate 25A.

Thus, the backlight box 40, in the box casing 23 of which there is provided the light transmitting/reflecting plate 25B, is able to illuminate the white light, appreciably reduced in variations in color and brightness, to the color liquid crystal display panel.

Meanwhile, the higher the reflectance of the light transmitting/reflecting plate 25B, the more uniform is the distribution of brightness and the lesser is the variation in color or brightness. However, if the reflectance of the light transmitting/reflecting plate 25B is excessive, the number of times of multiple reflection in the box casing 23 is increased, thus possibly leading to attenuation of light incident on the light transmitting/diffusing plate 41. The reason is that the reflectance of the reflective surface 24 is not completely 100% and that the light incident on the light emitting diodes 21 is thereby absorbed.

Hence, the utilization efficiency of light radiated from the backlight box 40 may be raised by increasing the reflectance of the reflective surface 24 and by diminishing the area of absorption of the light in the light emitting diode 21.

Since the variations in color and brightness are affected by the number and the locations of the light emitting diodes 21, the film thickness of the multi-layer dielectric film or the number of layers of the high refractive index material and/or the low refractive index material may be changed, depending on the location of the light transmitting/reflecting plate 25B, thereby changing the reflectance by way of flexible adjustment for diminishing the variations in color and brightness.

THIRD EMBODIMENT

Figure 14:
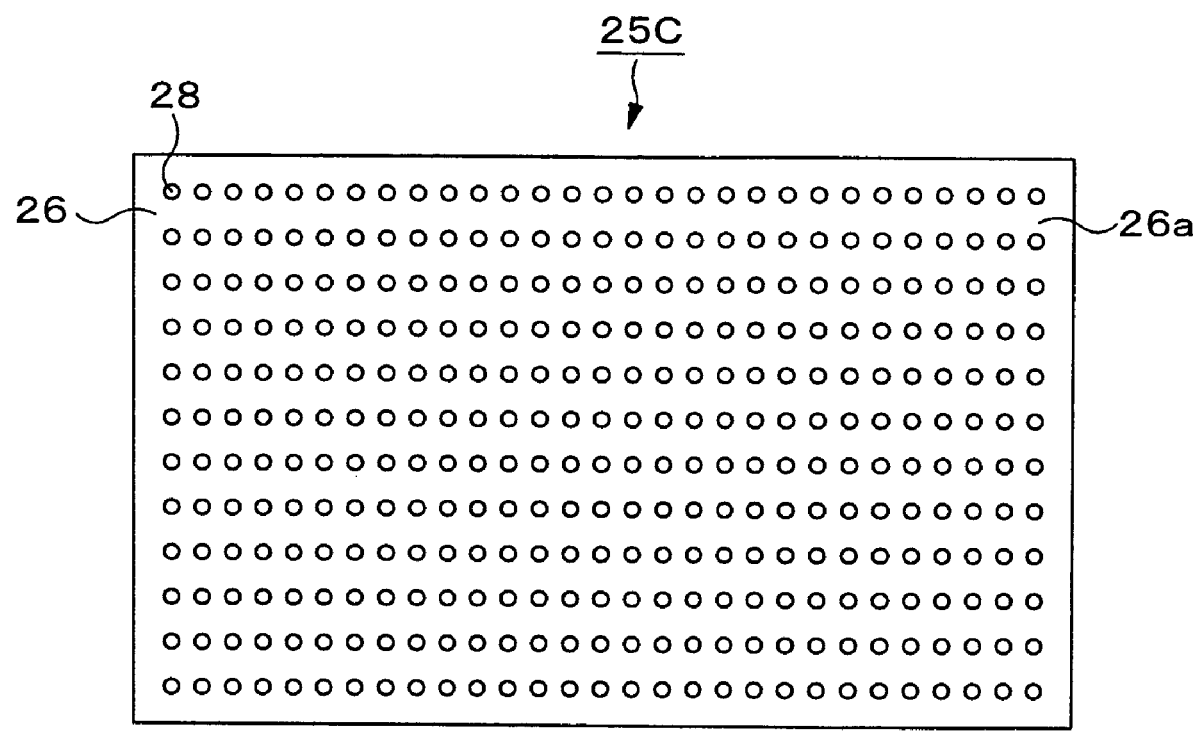
FIG. 14 illustrates a reflecting/transmitting plate obtained on patterning the multi-layered dielectric film, shown as a third embodiment, on the total transmission plate.

As the light transmitting/reflecting plate 25, a light transmitting/reflecting plate 25C, shown in FIG. 14, may be thought of. The light transmitting/reflecting plate 25C represents the combination of the first and second embodiments. Specifically, a number of multi-layer dielectric films 28, each made up by a layered assembly of a thin film formed of a low refractive index material and a thin film of a high refractive index material, both controlled as to reflectance (transmittance), are formed as dots, by patterning, similarly to the total reflection mirrors 27, on the full transmitting plate 26, used with the light transmitting/reflecting plate 25A.

This light transmitting/reflecting plate 25C has the merits of the light transmitting/reflecting plate 25A and of the light transmitting/reflecting plate 25B in combination. That is, similarly to the light transmitting/reflecting plate 25B, the light transmitting/reflecting plate 25C is able to diffuse the light, transmitted through the light transmitting/reflecting plate 25C to fall on the light incident surface 41a of the light transmitting/diffusing plate 41, to a broader area. Consequently, the white light radiated from the backlight box 40, provided with this light transmitting/reflecting plate 25C, may be appreciably freed of variations in color and brightness.

Moreover, with this light transmitting/reflecting plate 25C, variations in color and brightness may be adjusted more intricately, with adjustment of the number of dots and/or dot distribution of the multi-layer dielectric film 28, adjustment of dot areas, or with adjustment of the film thickness of the multi-layered dielectric film, or the number of layers of the low refractive index thin films or the high refractive index thin films, as parameters, in dependence upon the size of the liquid crystal display panel and/or the structure of the backlight box 40, such as the number or the locations of the light emitting diodes 21.

By providing, in the box casing 23 of the backlight box 40, forming the color liquid crystal display device 100, the aforementioned light transmitting/reflecting plate 25, partially transmitting and partially reflecting the incident light, it is possible not only to reduce the variations in color or brightness of white light but also to reduce significantly the thickness of the backlight box 40. More specifically, with the backlight box 40 illuminating the 23 inch size liquid crystal display panel, and with the height of the light emitting diode unit 21n, inclusive of a mold part, on the order of 6 to 7 mm, it is possible, by providing the light transmitting/reflecting plate 25 within the box casing 23, to reduce the thickness of the box casing 23 from about 8 to 10 cm, necessary in the conventional system, to about 2 to 5 cm.

Moreover, by providing the light transmitting/reflecting plate 25, the light radiated from the light emitting diodes 21 may be distributed efficiently throughout the inside of the box casing 23, so that it is possible to reduce the number of the light emitting diodes used and hence the cost.

In the best mode for carrying out the present invention, the light emitting diodes 21 are used as the light sources provided to the backlight box 40 of the color liquid crystal display device 100. However, if fluorescent lamps are used in place of the light emitting diodes 21, it is similarly possible to reduce the thickness of the backlight box 40 and to reduce the variations in color or brightness significantly. In addition, by providing the light transmitting/reflecting plate 25, the white light, radiated from the fluorescent lamps, may be distributed efficiently into the entire space within the box casing 23, with the result that the number of the fluorescent lamps used may be reduced, thereby lowering the cost.

The present invention is not limited to the above embodiments explained with reference to the drawings and, as will be apparent to those skilled in the art, various changes, substitutions or equivalents may be attempted without departing from the scope of the invention as defined in the claims.

The invention claimed is:

1. A subjacent type backlight device for illuminating a liquid crystal display panel comprising:
    a light source arranged in a casing having an opening for radiating light from said light source;
    a reflective surface on the inner lateral and bottom sides of said casing;
    light transmitting reflecting means in said casing located parallel to the opening and above the light source, said light transmitting reflecting means partially transmitting and partially reflecting incident light from the light source and the light internally reflected by the reflective surface; and
    transmitting diffusing means in said casing and located above the light transmitting reflecting means for diffusing and mixing the light transmitted through said light transmitting reflecting means and for causing surface light radiation.

2. The backlight device according to claim 1 wherein said light transmitting reflecting means is formed by a light transmitting member transmitting the light incident on said light transmitting reflecting means and a plurality of total reflection mirrors formed by patterning on said light transmitting member for reflecting the incident light by total reflection so that light incident on and transmitted through said light transmitting reflecting means bears a preset ratio to the light incident on and reflected by said light transmitting reflecting means.

3. The backlight device according to claim 1 wherein said light transmitting reflecting means is formed by a light transmitting member transmitting the incident light and a plurality of multi-layered dielectric films, each composed of at least one high refractive index film and at least one low refractive index film, layered together, said multi-layered dielectric films transmitting and reflecting the incident light at a preset proportion so that the light incident on and transmitted through said light transmitting reflecting means will have a preset ratio to the light incident on and reflected by said light transmitting reflecting means.

4. The backlight device according to claim 1 wherein the light transmitting reflecting means is formed by a substrate member and multi-layer dielectric films formed thereon, said multi-layer dielectric films each being composed of at least one high refractive index film and at least one low refractive index film, layered together, so that the light incident on and transmitting through said light transmitting reflecting means will have a preset ratio to the light incident on and reflected by said light transmitting reflecting means.

5. The backlight device according to claim 1 wherein said light source is a red light emitting diode emitting red light, a green light emitting diode emitting green light and a blue light emitting diode emitting blue light.

6. The backlight device according to claim 1 wherein said light source is a fluorescent lamp emitting white light.

7. The backlight device according to claim 1 wherein said light transmitting reflecting means is arranged in the casing for delimiting said space as by bisecting the inside of the casing.

8. A liquid crystal display device including a light transmitting liquid crystal display panel and a subjacent type backlight device for illuminating said liquid crystal display panel, said backlight device comprising:

a light source in a casing having an opening for radiating light from said light source;

a light reflective surface ob the inner lateral and bottom sides of said casing;

light transmitting reflecting means in said casing located parallel to the opening and above the light source, said light transmitting reflecting means partially transmitting and partially reflecting incident light from the light source and the light internally reflected by the reflective surface; and transmitting diffusing means in said casing and located above said light transmitting reflecting means for diffusing and mixing the light transmitted through said light transmitting reflecting means and for causing surface light radiation.

9. The liquid crystal display device according to claim 8 wherein said light transmitting reflecting means is formed by a light transmitting member transmitting the light incident on said light transmitting reflecting means and a plurality of total reflection mirrors formed by patterning on said light transmitting member for reflecting the incident light by total reflection so that light incident on and transmitted through said light transmitting reflecting means bears a preset ratio to the light incident on and reflected by said light transmitting reflecting means.

10. The liquid crystal display device according to claim 8 wherein said light transmitting reflecting means is formed by a light transmitting member transmitting the incident light and a plurality of multi-layered dielectric films each composed of at least one high refractive index film and at least one low refractive index film, layered together, said multi-layered dielectric films transmitting and reflecting the incident light at a preset proportion so that the light incident on and transmitting through said light transmitting reflecting means will have a preset ratio to the light incident on and reflected by said light transmitting reflecting means.

11. The liquid crystal display device according to claim 8 wherein said light transmitting reflecting means is formed by a substrate member and a multi-layer dielectric film formed thereon, said multi-layer dielectric film being composed of at least one high refractive index film and at least one low refractive index film, layered together, so that the light incident on and transmitting through said light transmitting reflecting means will have a preset ratio to the light incident on and reflected by said light transmitting reflecting means.

12. The liquid crystal display device according to claim 8 wherein the light source is a red light emitting diode emitting red light, a green light emitting diode emitting green light and a blue light emitting diode emitting blue light.

13. The liquid crystal display device according to claim 8 wherein the light source is a fluorescent lamp emitting white light.

14. The liquid crystal display device according to claim 8 wherein the light transmitting reflecting means is arranged in said casing delimiting said space as by bisecting the inside of the casing.

* * * * *